US009995006B2

(12) United States Patent
Kuse et al.

(10) Patent No.: US 9,995,006 B2
(45) Date of Patent: Jun. 12, 2018

(54) RAILWAY SLEEPER COMPOSED OF FIBRE-REINFORCED STONEWARE

(71) Applicants: Kolja Kuse, München (DE); Matthias Müller, Merzenich (DE); Ömer Bucak, Weingarten (DE)

(72) Inventors: Kolja Kuse, München (DE); Matthias Müller, Merzenich (DE); Ömer Bucak, Weingarten (DE)

( * ) Notice: Subject to any disclaimer, the term of this patent is extended or adjusted under 35 U.S.C. 154(b) by 328 days.

(21) Appl. No.: 14/769,677

(22) PCT Filed: Dec. 3, 2013

(86) PCT No.: PCT/EP2013/003647
§ 371 (c)(1),
(2) Date: Aug. 21, 2015

(87) PCT Pub. No.: WO2014/086481
PCT Pub. Date: Jun. 12, 2014

(65) Prior Publication Data
US 2016/0040364 A1 Feb. 11, 2016

(30) Foreign Application Priority Data

Dec. 3, 2012 (DE) .................... 20 2012 011 524 U

(51) Int. Cl.
*E01B 3/36* (2006.01)
*E01B 3/46* (2006.01)
(Continued)

(52) U.S. Cl.
CPC .................. *E01B 3/36* (2013.01); *E01B 3/30* (2013.01); *E01B 3/46* (2013.01); *E01B 26/00* (2013.01); *H02S 20/21* (2014.12); *E01B 3/32* (2013.01)

(58) Field of Classification Search
CPC ..... E01B 3/10; E01B 3/28; E01B 3/30; E01B 3/32; E01B 3/36; E01B 3/38; E01B 3/40; E01B 3/42
USPC .......................................... 238/308, 370, 37
See application file for complete search history.

(56) References Cited

U.S. PATENT DOCUMENTS

| 562,974 A | 6/1896 | Ratcliff |
| 4,177,789 A * | 12/1979 | Marocco .................. B23Q 3/08 125/1 |

(Continued)

FOREIGN PATENT DOCUMENTS

| BR | MU8502972 U | 6/2007 |
| CH | 263584 A | 9/1949 |

(Continued)

OTHER PUBLICATIONS

PCT/EP2013/003647 International Search Report dated Feb. 12, 2014.

*Primary Examiner* — Mark T Le
(74) *Attorney, Agent, or Firm* — King & Schickli, PLLC

(57) ABSTRACT

A new type of railway sleeper is composed of fiber-stabilized stoneware. By using a plurality of fiber-layered stone plates bonded to one another in such a way that prestress is generated in the stoneware, a permanently high-performance-capable sleeper is obtained, which is made of natural materials such as granite or basalt which occur almost everywhere on the earth in unlimited quantities and have a substantially longer service life and are substantially more resistant to influences of the weather and the environment than previous solutions. In addition, the sleeper or the intermediate spaces thereof are equipped with photovoltaic modules which together form a power unit when they are coupled together and connected electrically to the rails. Such sleepers can also be partially hollow as a light weight design (Continued)

variant. Lightweight variants with a hollow profile can be filled entirely or partially with track ballast from the side during the laying process.

14 Claims, 5 Drawing Sheets

(51) Int. Cl.
  *E01B 3/30* (2006.01)
  *H02S 20/21* (2014.01)
  *E01B 26/00* (2006.01)
  *E01B 3/32* (2006.01)

(56) References Cited

U.S. PATENT DOCUMENTS

| | | | |
|---|---|---|---|
| 4,286,753 A | 9/1981 | Lee | |
| 4,609,144 A * | 9/1986 | Harmsen | E01B 1/005 238/1 |
| 5,758,821 A * | 6/1998 | Wirthwein | E01B 9/06 238/366 |
| 6,293,121 B1 * | 9/2001 | Labrador | B01D 61/10 62/304 |
| 2005/0020168 A1 * | 1/2005 | Pott | B32B 5/26 442/268 |
| 2011/0129350 A1 * | 6/2011 | Grove-Nielsen | B29C 70/025 416/230 |
| 2012/0190812 A1 * | 7/2012 | Okabe | C08G 64/0208 527/300 |

FOREIGN PATENT DOCUMENTS

| | | | |
|---|---|---|---|
| DE | 298 18 660 | * | 4/1999 |
| DE | 202010009863 U1 | | 11/2010 |
| DE | 202011103383 U1 | | 9/2011 |
| EP | 0 297 006 | * | 12/1988 |
| EP | 1062092 B1 | | 12/2000 |
| JP | 7 252801 | * | 10/1995 |
| WO | WO 00/23272 | * | 4/2000 |

* cited by examiner

RAILWAY SLEEPER COMPOSED OF FIBRE-REINFORCED STONEWARE

TECHNICAL FIELD

The present invention relates to the development of railway sleepers that are required for supporting and laying of tracks, for example, railroad tracks and their fastening and anchoring in the subsurface.

BACKGROUND

Such sleepers are located typically in the gravel bed and are usually installed at a distance of a ⅔ meter. The challenge in the structural implementation of parts that were previously partially produced with relatively simple means from wood, is that these must more and more be made of artificial substances, as it is no longer disputed that climate change affects timber and render it unsuitable for use as a mass application.

Newer designs have changed over to concrete that has to be pre-stressed through constructive means—for example, threaded steel bars must be molded into the concrete or set into the wet concrete and secured by means of nuts on the ends when the concrete hardens, such that the concrete tensile stability is maintained with the help of a fixed pre-tension. This is adjusted by the torque when tightening the nut. The downside is that such threaded bars either rust or if they are made of stainless steel, can tear or lose a part of the pre-stress over a period of time. The concrete can become brittle and crack, moisture and frost and the change in the concrete over time then do the rest, affecting the sustainability adversely. In concrete sleepers, cracks and hairline cracks are already planned during dimensioning, as these cannot be prevented in prestressed concrete—at least on the tension side. During load tests hairline cracks are admissible. Wooden sleepers do not have hairline cracks, but are affected by weather changes.

SUMMARY

The aim at present is to build a sleeper which protects timber reserves through the elimination of cracking as in concrete sleepers, and especially in their production with a slight $CO_2$ rucksack compared to sleepers of steel and concrete. The production of concrete and steel sleepers requires a lot of energy, which today unfortunately is associated with emission of a large amount of $CO_2$ generated during its production.

Furthermore the aim is to create a universal new concept, which can be used worldwide in different climatic conditions, which is insensitive to minimum and maximum temperature values and influences such as humidity, weather i.e., water, frost and atmospheric chemistry, and the materials used are not harmed in any way so that the result can be sustainable and durable solutions that remain stable across generations and can be produced with the help of local resources almost anywhere. A crucial role is also played by weight, strength, processability, and finally the type of surface, not only due to cleaning issues, but also because color and visual impression decide the suitability of a solution not to mention adaptation to all situations, whether in nature or in more enclosed spaces such as railway stations or even open platforms.

The proposed idea is to configure a sandwich of materials, which solves all the problem areas mentioned above simultaneously. The aim is to optimize sustainable, not variable load capacity and resistance values, vibration damping, easy processability in terms of connecting with the rail, the crack-free long-term durability of the part itself, as well as the durability of the surface and the possibility of integration of additional functionalities.

These may include, for example, the supply of electrical. energy to the rail by means of solar panels, hot water through a warming stone and related energy technology solutions. Previous solutions primarily consider only the strength values. The aim is also to reduce the consumption of energy that must be used for railway sleepers to produce the parts. The suggested way here is to form a new platform for the above-described further developments of such sleepers. The production of such a sleeper from granite requires less energy that to produce a comparable sleeper of concrete. Next, one must consider the manufacturing energy of stabilizing materials, steel should be replaced with fibrous material. In future, carbon fiber can be used preferably, and the required matrix can be achieved with the help of modern resin systems by using renewable raw materials based on plants, the $CO_2$ in the atmosphere. This harmful $CO_2$ can be extracted from the atmosphere permanently and also bound in the building material itself.

The present invention accordingly describes a sandwich of several sheets of natural stone or artificial stoneware, such as concrete or ceramic, which by means of an intermediate layer of fibrous material and connecting matrix—are interconnected—for example, via epoxy resins or other glue-like agents. In most cases it will be convenient to make this composite stone fiber material and resin so that the fiber layers, the stone slabs are already prestressed, so that no time-consuming pre-stressing with threaded rods or rods of steel is necessary. This bias should preferably be generated by a type of fiber which does not lose this pre-stress. Most suitable are carbon fibers and rock fibers, as outlined in EP 106 20 92. In principle, all possible types of natural stone can be used.

The surface covers are preferably formed by a stone layer to absorb the effects of the weather. Ideally, the sleeper should have three slabs, for mechanical reasons the central panel can be designed significantly thicker than the bars that form the upper and lower cover plates. From today's perspective epoxy resins are well suited to bond fiber and stone, especially if the porosity of the stone is suitable for the penetration of the resin.

Composite holes are drilled at the top of this plate, in which the fixing pins of the base plate can be screwed by means of dowels, wherein the support plate of the rail, the so-called ribbed plate is a common support plate which allows screwing with the brackets enclosing the rails.

Since the finished stone sleeper is automatically biased by the fiber matrix during the manufacturing process in the oven, it can accommodate dynamic compressive and tensile forces after hardening, leveraging the good self-damping properties, for example of granite to quickly reduce natural oscillations in the system. The granite, which does not really weight more than aluminum, becomes a high-tech material using the fiber, and has a compressive strength comparable to that of steel, the missing, but required tensile stability is given to the material by pre-stressing using thin layers of carbon fibers. Granite is available on earth in unlimited quantities and in almost every country. Since it will be possible in future to produce carbon fibers also from the $CO_2$ in the atmosphere, it is possible not only to develop materials that require less production energy, but it will also be possible to bind—as before the wood—the harmful atmospheric carbon which has been identified by climate research as a cause of much of the climatic changes on Earth.

As granite and other rocks are frost-proof though water-absorbing, they are stable even at extreme sub-zero temperatures. There is hardly any material that is more durable than granite or basalt. If enough granite is not available for conversion initially, concrete slabs can be made and pre-stressed with the fibers on an interim basis, or the fibers can be mixed into the concrete.

Additionally, the sleeper should have the option of generating electricity with the help of photovoltaic panels. This can be fed directly to power grids via the rails.

To this end, solar panels are applied to the stone surface, either directly or with the aid of a frame. In general, thin-film modules available today that are more cost effective than older techniques can be glued directly on the stone surface partly and/or fixed by means of appropriate framework in the areas between the sleepers.

The rail itself can take over the function of the power line, where the solar panels are connected to the rails directly with positive and negative poles.

The hollow or sectional sleepers can also be used, either to save weight or to provide cable ducts for the passage of live cabling or communication wires.

BRIEF DESCRIPTION OF THE DRAWING FIGURES

DETAILED DESCRIPTION

Figure 1:
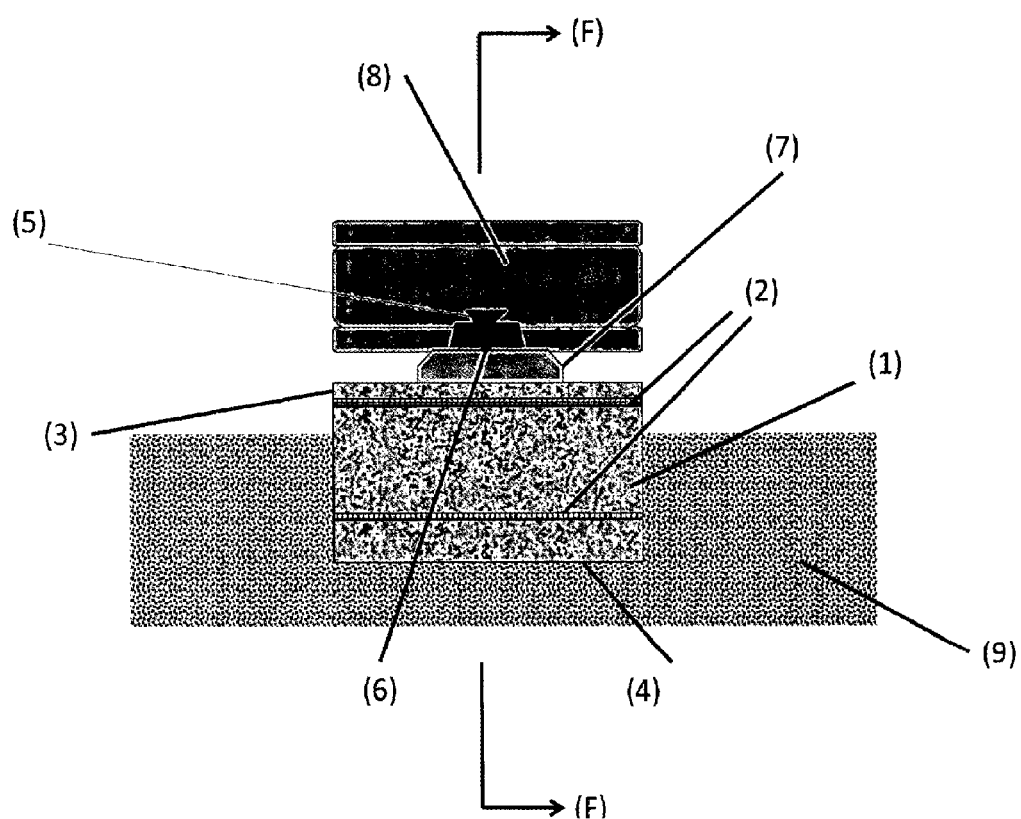
FIG. 1 is an illustration of one embodiment of a railway sleeper according to the disclosure.

One of the many possible embodiments of the invention described in FIG. 1 is a side view of a 15 cm thick slab of granite (1) which has a fiber coating connected with the matrix (2) of an upper (3) and lower cover plate (4). A mechanical bridge in the form of a plastic rib plate (7) is screwed with the plate composite stone (1-4) with the help of screw mounting pins (5). The insulating ribbed plate (7) supports the rail (8), allowing its fastening by means of staples (6) which are held by fastening pins (5) and it holds the rail under pretension downwards. The sleeper itself is located in the gravel bed (9).

Figure 2:
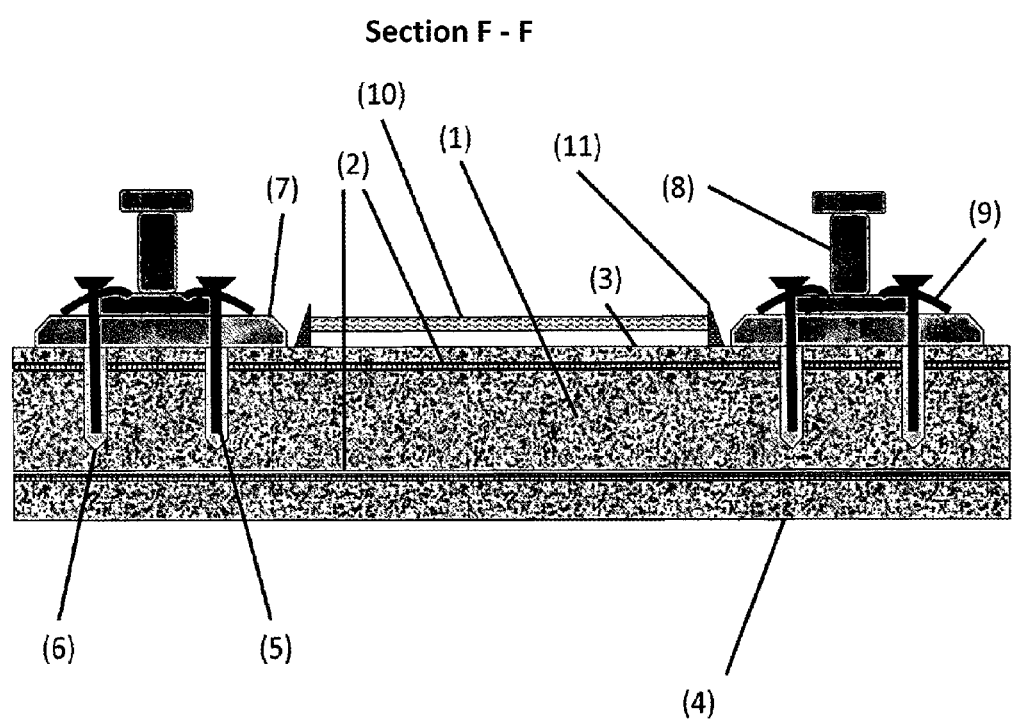
FIG. 2 is a cross-section taken along line F-F of FIG. 1.

FIG. 2 shows the body in FIG. 1 in cross section F-F, which is about 15 cm thick granite plate (1), which is connected via a fiber coating with the matrix (2) of an upper (3) and lower cover plate (4), a mechanical bridge in the form of a plastic rib plate (7) is joined to the plate composite stone (1-4) with screw mounting pins (5) and plastic dowels (6). The insulating ribbed plate (7) supports the rail (8), allowing its fastening by means of clamps (9) of the fastening pins (5) and it holds the rail downwards under pretension.

A thin-film solar panel (10) is applied on the polished surface of the upper stone cover plate by means of a frame (11) which may also have a rear ventilation if necessary.

Provisionally, such sleepers can be also made of concrete, until sufficient stone material is found and mined. In this case, the fiber is ideally mixed into the concrete.

Figure 3:
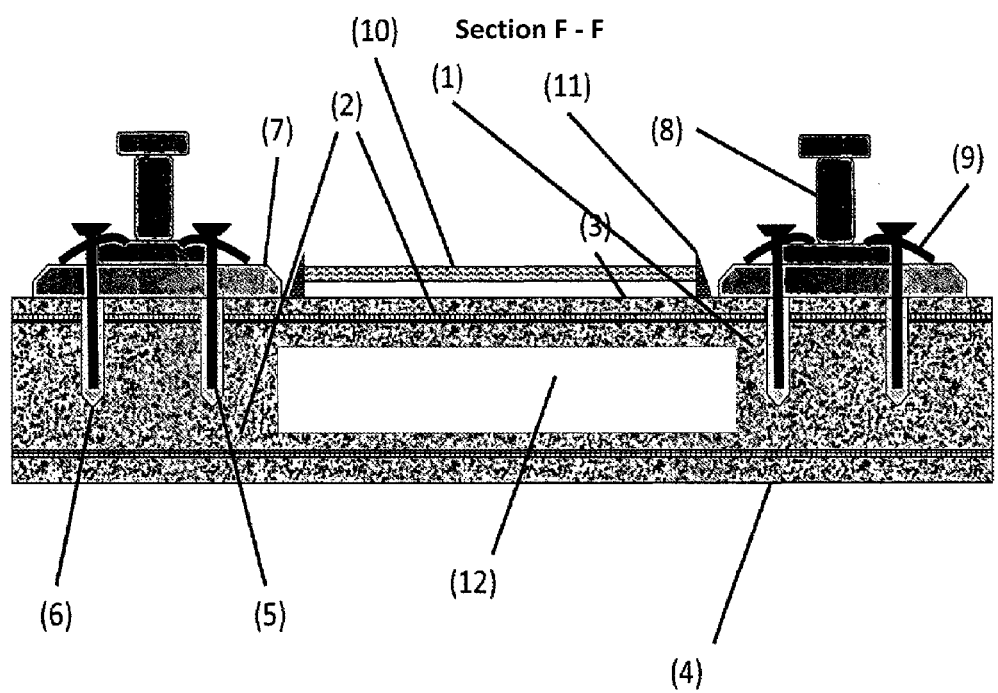
FIG. 3 illustrates another embodiment in a cross-section along line F-F of FIG. 1.

In FIG. 3, the body of FIG. 1 is shown in section F-F as a partially hollow model of a sleeper (1) with an internal cavity (12).

Figure 4:
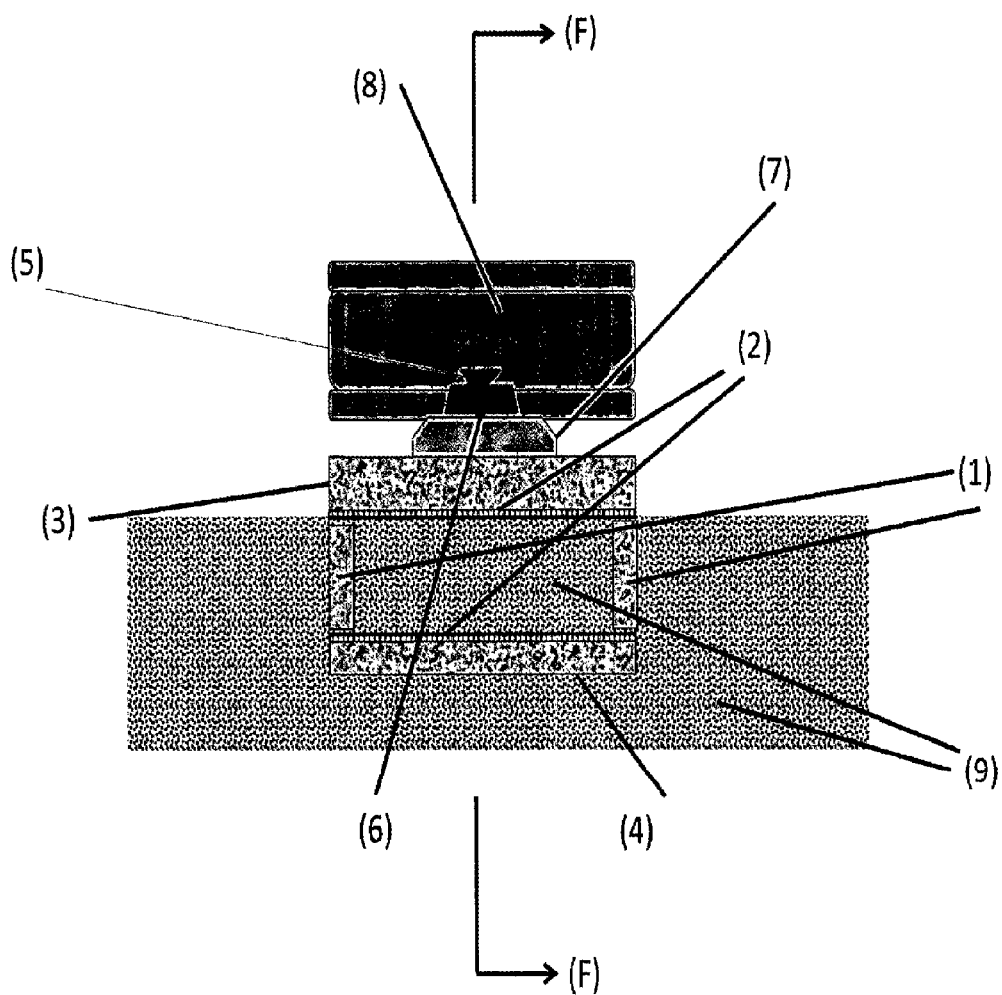
FIG. 4 illustrates a hollow railway sleeper.
Figure 5:
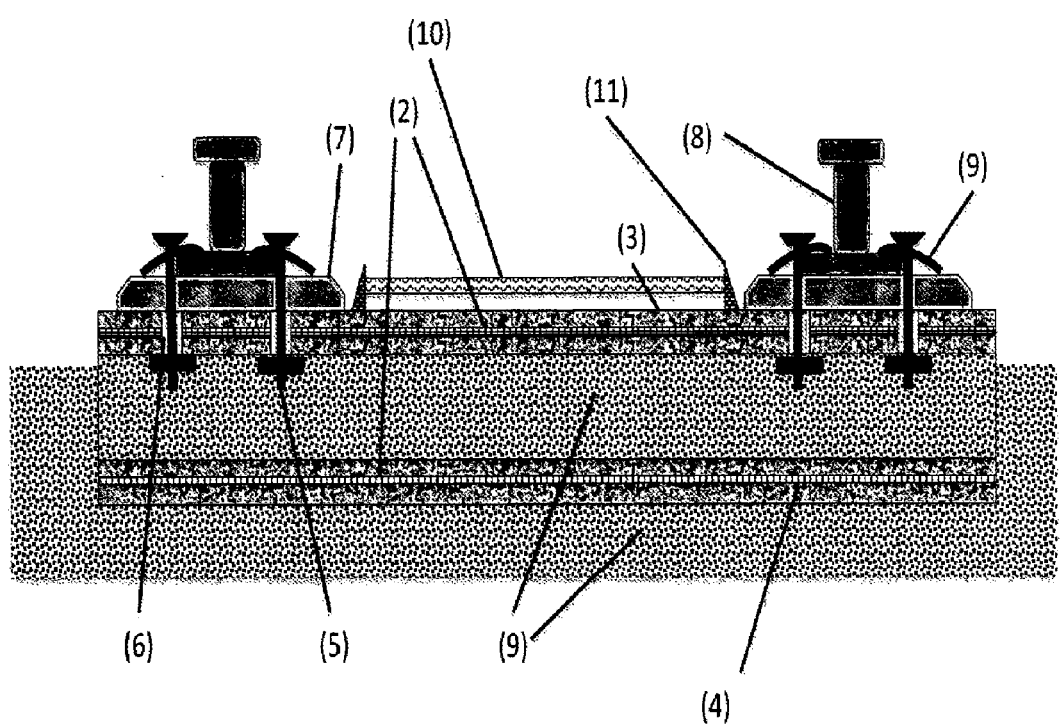
FIG. 5 illustrates a cross-section along line F-F of FIG. 4.

FIG. 4 shows the body of FIG. 1 as a hollow railway sleeper and FIG. 5 shows its Section F-F, where the open side of the hollow body has been filled from the side with rail-gravel (9).

The invention claimed is:

1. An arrangement comprising:
   a flat or curved earthenware beam, characterized in that the earthenware beam lies in a core of the arrangement and is stabilized with fiber to prevent breaches, the earthenware beam having at least two sides, an earthenware covering layer and a pre-tensioned interlayer arranged on each of the two sides, wherein the fiber and a connecting matrix serve as the pretensioned interlayer connecting the earthenware covering layer with the earthenware beam, and the arrangement is configured as a sleeper for railway tracks.

2. The arrangement according to claim 1, characterized in that the fiber matrix includes a fibrous material selected from a glass fiber, carbon fiber, mineral fiber, aramid fiber, natural fiber or steel fibers, or a mixture of these fibers.

3. The arrangement according to claim 2, characterized in that the natural fiber is flax, hemp, maize, cotton, wood, bamboo or a carbonized plant fiber.

4. The arrangement according to claim 2, characterized in that the connecting matrix is a matrix of resins produced from renewable plant materials.

5. The arrangement according to claim 1, characterized in that the matrix is selected from the group consisting of epoxy resins, thermoplastic resins and synthetic resins and the earthenware beam is made of granite, marble, basalt, sandstone, slate, concrete, resin-bonded quartz, stone dust or ceramic.

6. The arrangement according to claim 1, characterized in that the matrix of the earthenware beam contains different fibers in different layers.

7. The arrangement of claim 1, characterized in that a visible side surface of the earthenware beam is polished or ground to ensure different water absorption behavior and different optics through different porosity levels.

8. The arrangement of claim 1, characterized in that a surface of the earthenware covering layer on top of the earthenware beam or a space between two sleepers or both is occupied by a photovoltaic layer.

9. The arrangement of claim 8, characterized in that the photovoltaic layer has a frame by means of which the photovoltaic layer is mounted onto the surface of the earthenware covering layer on top of the earthenware beam.

10. The arrangement of claim 8, characterized in that the photovoltaic layer is connected to a surface of the earthenware covering layer on top of the earthenware beam and can not be removed without damage.

11. The arrangement of claim 1, characterized in that a ribbed plate is attached between one of the railway tracks and the beam by plugs.

12. The arrangement of claim 1, characterized in that the earthenware beam is completely hollow on the inside and constitutes a pipe or is partially hollowed or has a closed or partially closed cavity, the cavity is partially or completely filled with ballast.

13. An apparatus, comprising:
   a railway sleeper having a core comprising an earthenware beam having at least two sides, an earthenware covering layer and a pre-tensioned layer arranged on each of the two sides, wherein the pre-tensioned layer includes a fiber and a connecting matrix serving as an interlayer connecting the earthenware covering layer with the earthenware beam; and at least one rail connected to the railway sleeper.

14. The apparatus of claim 13, wherein the earthenware covering layer comprises natural stone, and the fiber comprises carbon fiber.

\* \* \* \* \*